United States Patent
Wu et al.

(10) Patent No.: US 7,660,480 B1
(45) Date of Patent: Feb. 9, 2010

(54) PRACTICAL FAST MESH-FREE ANALYSIS

(75) Inventors: Cheng-Tang Wu, Livermore, CA (US); Hongsheng Lu, Livermore, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 736 days.

(21) Appl. No.: 11/351,794

(22) Filed: Feb. 10, 2006

(51) Int. Cl.
G06K 9/40 (2006.01)
G06F 7/60 (2006.01)
G06F 17/10 (2006.01)
G06F 9/45 (2006.01)
G06F 9/455 (2006.01)
G06T 15/00 (2006.01)
G06T 17/00 (2006.01)
G06T 15/30 (2006.01)
G06T 17/20 (2006.01)

(52) U.S. Cl. ............................. 382/264; 703/2; 703/22; 703/23; 703/24; 703/25; 703/26; 703/27; 703/28; 345/419; 345/423; 345/420

(58) Field of Classification Search ........................ None
See application file for complete search history.

(56) References Cited

U.S. PATENT DOCUMENTS

| | | | | |
|---|---|---|---|---|
| 6,718,291 | B1 * | 4/2004 | Shapiro et al. | 703/2 |
| 6,987,511 | B2 * | 1/2006 | Taubin | 345/420 |
| 7,499,050 | B2 * | 3/2009 | Wu et al. | 345/420 |
| 7,616,204 | B2 * | 11/2009 | Muller et al. | 345/474 |
| 2003/0005007 | A1 * | 1/2003 | Neretti et al. | 708/300 |
| 2004/0071363 | A1 * | 4/2004 | Kouri et al. | 382/276 |
| 2006/0109163 | A1 * | 5/2006 | Cho et al. | 342/25 R |
| 2006/0149513 | A1 * | 7/2006 | Yoon | 703/2 |
| 2007/0185694 | A1 * | 8/2007 | Rousselier et al. | 703/2 |
| 2007/0276709 | A1 * | 11/2007 | Trimby et al. | 705/6 |

OTHER PUBLICATIONS

Meagher "Efficient Synthetic Image Generationof Arbitrary 3-D Objects", 1982 IEEE, pp. 473-478.
USPTO—1st Office Action mailed Jun. 28, 2007 (U.S. Appl. No. 10/990,003).
Applicant's Response to the 1st Office Action (U.S. Appl. No. 10/990,003) Sep. 19, 2007.

(Continued)

*Primary Examiner*—Vikkram Bali
*Assistant Examiner*—Michelle Entezari
(74) *Attorney, Agent, or Firm*—Roger H. Chu

(57) ABSTRACT

A two-level transformation scheme to enable a practical fast mesh-free method is disclosed. The first level transformation transforms the original chosen mesh-free shape function to a first transformed mesh-free shape function that preserves Kronecker delta properties. The first transformed mesh-free function allows the essential boundary conditions to be imposed directly. The second-level transformation scheme employs a low pass filter function served as a regularization process that filters out the higher-order terms in the monomial mesh-free approximation obtained from the first-level transformation scheme with desired consistency and completeness conditions. This integration scheme requires only a low-order integration rule comparing to the high order integration rule used in the traditional mesh-free methods. The present invention simplifies the boundary condition treatments and avoids the usage of high-order integration rule and therefore is more practical than the traditional mesh-free methods.

18 Claims, 7 Drawing Sheets

OTHER PUBLICATIONS

Muller et al., "Point Based Animation of Elastic, Plastic and Melting Objects", 2004, SCM Eurographics, pp. 141-151.

USPTO—2nd Office Action mailed Nov. 30, 2007 (U.S. Appl. No. 10/990,003).

Applicant's Response to the 2nd Office Action (U.S. Appl. No. 10/990,003) Dec. 6, 2007.

USPTO—Office Action mailed Jan. 14, 2008 (U.S. Appl. No. 11/383,135).

Applicant's Response to the Office Action (U.S. Appl. No. 11/383,135) Jan. 16, 2008.

USPTO—Notice of Allowability mailed Apr. 21, 2008 (U.S. Appl. No. 11/383,135).

* cited by examiner

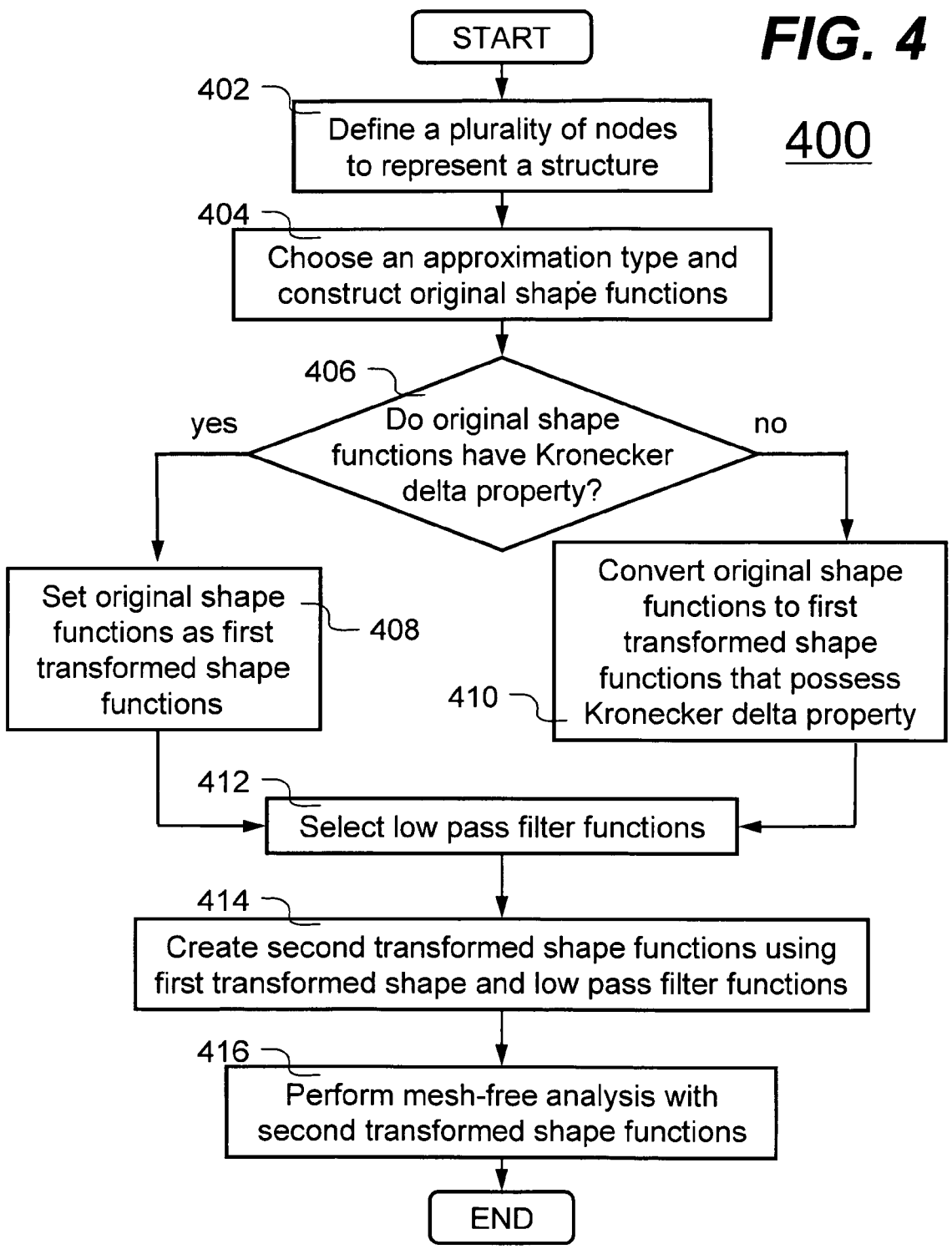

PRACTICAL FAST MESH-FREE ANALYSIS

BACKGROUND OF THE INVENTION

1. Field of the Invention

The present invention generally relates to method, system and computer program product used in design and analysis of a structure, more particularly to practical fast mesh-free analysis of a general three-dimensional structure.

2. Description of the Related Art

Finite element analysis (FEA) is a computerized method widely used in industry to model and solve engineering problems relating to complex systems since its invention in late 1950's. With the advent of the modern digital computer, FEA has been implemented as FEA computer program product. Basically, the FEA computer program product is provided with a model of the geometric description and the associated material properties at certain points within the model. In this model, the geometry of the system under analysis is represented by solids, shells and beams of various sizes, which are called elements. The vertices of the elements are referred to as nodes. The individual elements are connected together by a topological map, which is usually called mesh. The model is comprised of a finite number of elements, which are assigned a material name to associate with material properties. The model thus represents the physical space occupied by the object under analysis along with its immediate surroundings. The FEA computer program product then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

Although FEA has been successfully applied to many fields to simulate various engineering problems, there are some instances that FEA may not be advantageous due to numerical compatibility condition is not the same as the physical compatibility condition of a continuum. For example, in Lagrangian type of computations, one may experience mesh distortion, which can either end the computation altogether or result in dramatic deterioration of accuracy. In addition, the FEA often requires a very fine mesh in problems with high gradients or a distinct local character, which can be computationally expensive. For this reason, adaptive FEA has been developed.

Adaptive re-meshing procedures for simulations of impact/penetration problems, explosion/fragmentation problems, flow pass obstacles, and fluid-structure interaction problems etc., have become formidable tasks to undertake. The difficulties here are not only re-meshing, but also mapping the state variables from the old mesh to the new mesh. Hence, this process often introduces numerical errors; frequent re-mesh is not desirable. Another procedure called Arbitrary Lagrangian Eulerian (ALE) formulations has been developed. Its objective is to move the mesh independently of the material so that the mesh distortion can be minimized. Unfortunately, the mesh distortion still creates severe numerical errors for very large strain and high speed mechanical simulations especially when the mesh is coarse. An example is the strain localization problem, which is notorious for its mesh alignment sensitivity. Therefore it is computationally efficacious to discretize a continuum by a set of nodal points without mesh constraints.

The mesh-free analysis has become one of the focused research topics during the 1990's. Many applications of using mesh-free analysis have been achieved in the past decade. In comparison with conventional finite element methods, the characteristics of smoothness and naturally conforming of the approximation, exemption from meshing, and higher convergence rate and the easy of nodal insertion and deletion have make mesh-free methods attractive alternative numerical techniques for nonlinear analysis of industrial applications. The main disadvantage of mesh-free method against its popularity is the high computational requirement (i.e., high CPU cost). The high CPU cost is primarily resulting from the usage of high order of integration rule, the introduction of more neighboring information, the imposition of essential boundary conditions and the computation of the variable transfer. Recently, several recent advances have been made to enhance the computational efficiency. However, the improvements are still limited and most of the methods are not robust in the nonlinear and large deformation region. The major reasons are the inaccurate spatial integration and the lack of interpolation property in the mesh-free approximation. Therefore, it would be desirable to have a fast and practical mesh-free method for the general industrial applications with desired accuracy, robustness and wide applicability.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

A two-level transformation scheme to enable a practical fast mesh-free method is disclosed. The first level transformation transforms the original chosen mesh-free shape function to a first transformed mesh-free shape function that preserves Kronecker delta properties. The first transformed mesh-free function allows the essential boundary conditions to be imposed directly. The second-level transformation scheme employs a low pass filter function served as a regularization process that filters out the higher-order terms in the monomial mesh-free approximation obtained from the first-level transformation scheme with desired consistency and completeness conditions. This integration scheme requires only a low-order integration rule comparing to the high order integration rule used in the traditional mesh-free methods. The present invention simplifies the boundary condition treatments and avoids the usage of high-order integration rule and therefore is more practical than the traditional mesh-free methods.

The present invention discloses a new mesh-free approximation that preserves Kronecker delta properties. This process is called the first-level transformation since it can transform all the non-interpolated mesh-free shape functions into the interpolation functions. The new mesh-free approximations although share the interpolation properties that simplifies the boundary condition treatment but the first transformed mesh-free shape functions are high order monomial functions which impose huge difficulties in the numerical integration. Hence, the present invention discloses a second-level transformation scheme, which is used to resolve the above problem in the numerical integration. This second-level transformation scheme can be regarded as a low pass filter that filters out the high frequencies in the audio signal processing field. For images and indeed for all signals, the simultaneous appearance of multiple scales is known as multi-resolution. In computation mechanics, the second-level transformation scheme serves as a regularization process that filters out the higher-order terms in the monomial mesh-free approximation obtained from the first-level transformation scheme with desired consistency and completeness conditions. This integration scheme requires only a low-order integration rule comparing to the high order integration rule used in the traditional mesh-free methods. The combination of the first and second-level transformation schemes simplifies the boundary condition treatments and avoids the usage of high-order integration rule and therefore is more suitable for the large-scale computation than the traditional mesh-free methods.

According to one aspect, a plurality of nodes is defined to represent a structure with each node having a domain of influence or support associated. The shape of the support can be circular, rectangular, triangular, or any other shape. The mesh-free approximation is then chosen and a set of corresponding mesh-free shape functions (i.e., original chosen shape functions) is constructed for each domain of influence. If these original chosen mesh-free shape functions do not possess Kronecker delta properties, a first-level transformation is performed to convert the original chosen mesh-free shape functions into first transformed shape functions. Otherwise, no transformation is required for the original chosen shape functions. Due to the Kronecker delta properties, the first transformed shape functions ensure that the essential boundary conditions can be easily applied, when the mesh-free approximations are carried out. Due to the nature of the first-level transformation, the first transformed shape functions are high order monomial functions.

According to another aspect, a second-level transformation scheme is used to filter out the high order terms in the monomial functions from the first mesh-free transformation shape functions. The second transformed shape functions are created with the first transformed shape functions and a low pass filter function. As a result, the integration of the second transformed shape function can be achieved with a reasonable low number of integration points, thus less computing resources. One of the objects, features, and advantages of the present invention is to be capable of analyzing a general structure with geometric and material non-linearity using the mesh-free analysis with reasonable computer resources.

According to one embodiment as a method for practical fast mesh-free analysis of a general three-dimensional structure, the method comprises: defining a plurality of nodes representing the general structure; choosing a mesh-free approximation scheme; constructing a set of original mesh-free shape functions based on the mesh-free approximation scheme; when the mesh-free approximation is lack of Kronecker delta properties, converting the original shape function to a first transformed mesh-free shape function; otherwise, designating the original shape function as the first transformed mesh-free shape function; selecting a low pass filter function; and creating a second transformed mesh-free shape function using the low pass filter function and the first transformed mesh-free shape function.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 4 shows a flowchart or process for a practical fast mesh-free analysis in accordance with one embodiment of the present analysis.

DETAILED DESCRIPTION OF THE PREFERRED EMBODIMENTS

Figure 1A:
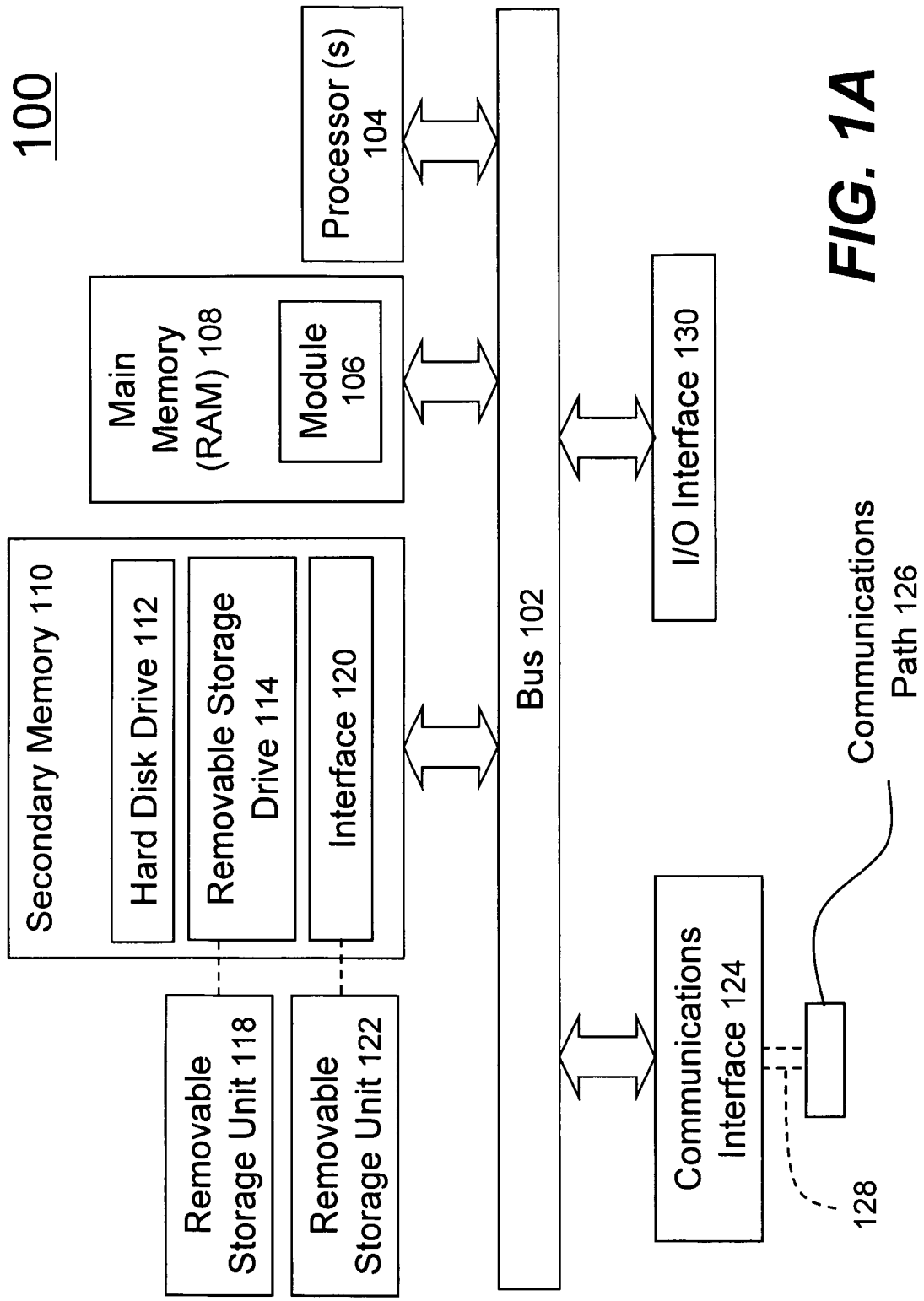
FIG. 1A depicts a block diagram of an exemplary computer, in which one embodiment of the present invention may be implemented.

A two-level transformation scheme to enable a practical fast mesh-free method is disclosed. The first level transformation transforms the original chosen mesh-free shape function to a first transformed mesh-free shape function that preserves Kronecker delta properties. The first transformed mesh-free function allows the essential boundary conditions to be imposed directly. The second-level transformation scheme employs a low pass filter function served as a regularization process that filters out the higher-order terms in the monomial mesh-free approximation obtained from the first-level transformation scheme with desired consistency and completeness conditions. This integration scheme requires only a low-order integration rule comparing to the high order integration rule used in the traditional mesh-free methods. The present invention simplifies the boundary condition treatments and avoids the usage of high-order integration rule and therefore is more practical than the traditional mesh-free methods.

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention does not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

FEA stands for Finite Element Analysis.

FEM stands for Finite Element Method, which is used interchangeably with FEA hereinafter.

Essential boundary condition is defined such as the structural constraints on a model.

Node, node point and point are used interchangeably hereinafter.

Boundary and border are used interchangeably hereinafter.

Domain of influence and support of a node in the mesh-free model are used interchangeably hereinafter.

Computer, computer system, and computing device are used interchangeably hereinafter.

Embodiments of the present invention are discussed herein with reference to FIGS. 1A-4. However, those skilled in the art will readily appreciate that the detailed description given herein with respect to these figures is for explanatory purposes as the invention extends beyond these limited embodiments.

Referring now to the drawings, in which like numerals refer to like parts throughout several views. The present invention may be implemented using hardware, software or a combination thereof and may be implemented in a computer system or other processing system. In fact, in one embodiment, the invention is directed toward one or more computer systems capable of carrying out the functionality described herein. An example of a computer system 100 is shown in FIG. 1A. The computer system 100 includes one or more processors, such as processor 104. The processor 104 is connected to a computer system internal communication bus 102. Various software embodiments are described in terms of this exemplary computer system. After reading this description, it will become apparent to a person skilled in the relevant art(s) how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services. Exemplary OS includes Linux®, Microsoft Windows®.

There may also be a communications interface 124 connecting to the bus 106. Communications interface 124 allows software and data to be transferred between computer system 100 and external devices. Examples of communications interface 124 may include a modem, a network interface (such as an Ethernet card), a communications port, a PCMCIA slot and card, etc. Software and data transferred via communications interface 124 are in the form of signals 128 which may be electronic, electromagnetic, optical, or other signals capable of being received by communications interface 124.

These signals 128 are provided to communications interface 124 via a communications path (i.e., channel) 126. This channel 126 carries signals (or data flows) 128 and may be implemented using wire or cable, fiber optics, a phone line, a cellular phone link, an RF link and other communications channels.

The channel 126 facilitates a data flow 128 between a data network (e.g. 150 in FIG. 1B) and the computer 100 and typically executes a special set of rules (i.e., a protocol) to send data back and forth. One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100.

In this document, the terms "computer program medium" and "computer usable medium" are used to generally refer to media such as removable storage drive 114, a hard disk installed in hard disk drive 112, and signals 128. These computer program products are means for providing software to computer system 100. The invention is directed to such computer program products.

The computer system 100 may also include an I/O interface 130, which provides the computer system 100 to access monitor, keyboard, mouse, printer, scanner, plotter, and a like.

Computer programs (also called computer control logic) are stored as application modules 106 in main memory 108 and/or secondary memory 110. Computer programs may also be received via communications interface 124. Such computer programs, when executed, enable the computer system 100 to perform the features of the present invention as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

In another embodiment, the present invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the present invention is implemented using a combination of both hardware and software.

The main memory 108 may be loaded with one or more application modules 106 that can be executed by one or more processors 104 with or without a user input through the I/O interface 130 to achieve desired tasks. In one embodiment, an application module is configured to facilitate representing the physical domain of a structure to be analyzed by defining a plurality of nodes each with associated domain of influence in a mesh-free analysis, and to facilitate calculating the solution using a set of mathematical approximations and corresponding set of shape functions. When the original chosen shape functions do not possess Kronecker delta properties, a first level transformation is performed to convert the original shape functions to the first transformed shape functions. Then a low pass filter function is chosen to perform a second transformation to the first transformed shape function. As a result, the high order non-linear characteristics of the first transformed shape function is filtered out. Therefore the second transformed shape functions can be integrated with less integration points thus less computing resources. In operation, when one or more processors 104 execute one of the application modules 106, the results are computed and stored in the secondary memory 110 (i.e., hard disk drive 112). The status of the computation (e.g., the progress of a structural analysis) is reported to the user via the I/O interface 130. The current state of a structure to be analyzed may be shown graphically for visual inspection. The graphical output is sent through the I/O interface 130 to a monitor.

Figure 1B:
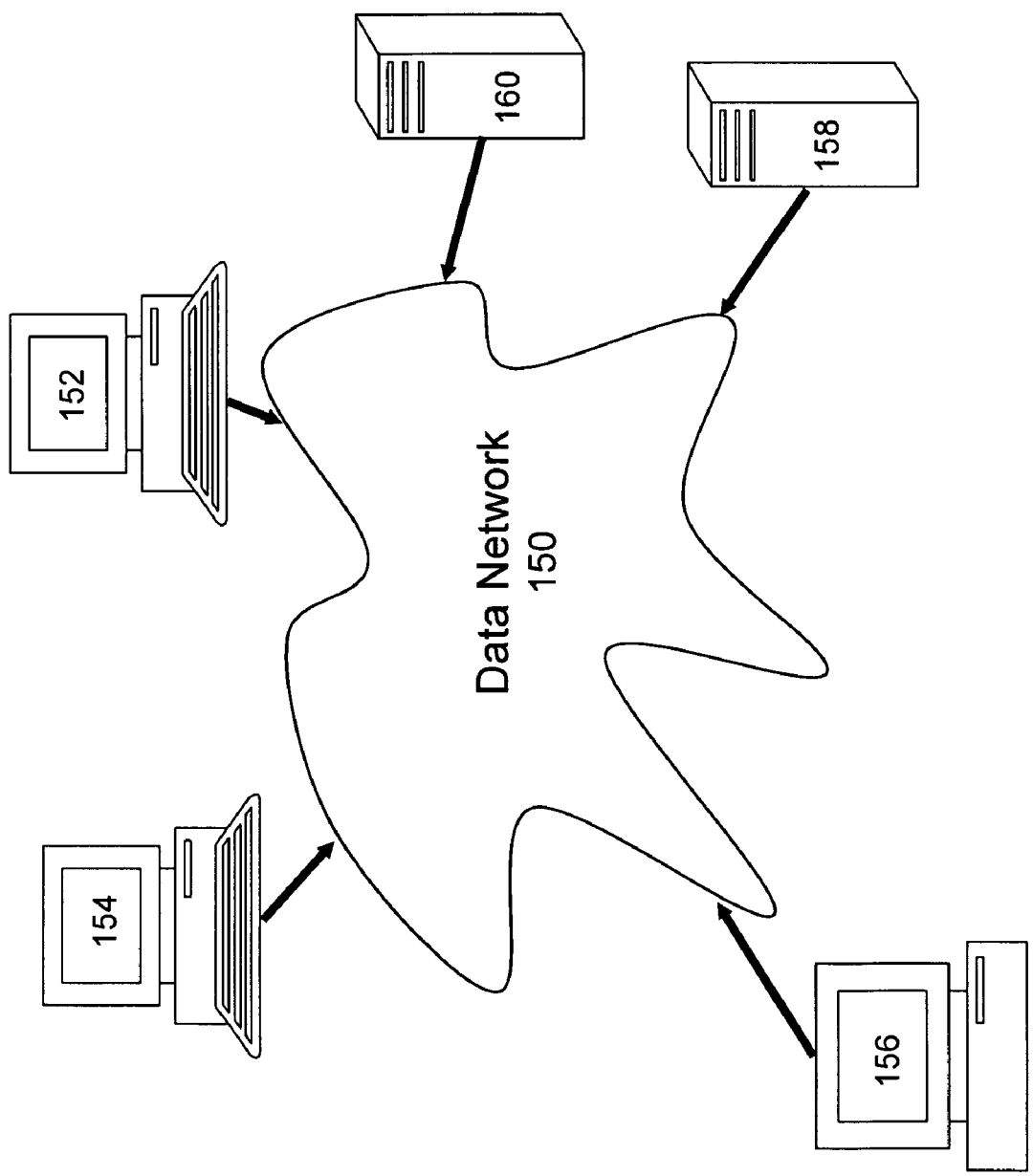
FIG. 1B depicts an exemplary network environment that another embodiment of the present invention may be implemented.

FIG. 1B depicts a networked computing environment 140, in which one embodiment of the present invention may be practiced. A plurality of network capable computing devices 152, 154, 156, 158 and 160 (e.g., the computer device 100 described in FIG. 1A) are coupled to a data network 150. These computing devices 152-160 can communicate with each other via the network 150. The data network 150 may include, but is not limited to, the Internet, an Intranet, local area network (LAN), wide area network (WAN), a wireless network or a data network comprises of public and private networks. In one embodiment, the application module (i.e., 106 in FIG. 1A) for the mesh-free analysis is configured and executed on the computing device 160. A user may prepare an input file describing the physical domain of a structure on a personal workstation computing device 152. The input file is then sent to the computing device 160 via the network 150 to facilitate the computation of mesh-free analysis. During the execution of the application module, the user may be able to monitor the progress of the analysis at another computing device 156. Finally after the analysis is completed, the user may examine the computed results by retrieving the stored result file from the computer 160 to any one of the computing devices 152, 154 or 156 for a post-processing, which in general includes a graphical representation of the analysis results.

In one embodiment, the input file includes the description of the physical domain represented by a plurality of nodes in a 3-D space. For a general 3-D structure, a background mesh such as FEA model may be used to represent the shell structure. The mesh-free shape functions are selected and transformed to accommodate the essential boundary conditions if necessary. Then a second transformation is performed to filter out the high order non-linear characteristics of the first transformed shape function, such that the integration can be performed with less number of integration points. One exemplary implementation of this technique is included in a well-known engineering computer program product application, LS-DYNA®, offered by Livermore Software Technology Corporation.

Figure 2:
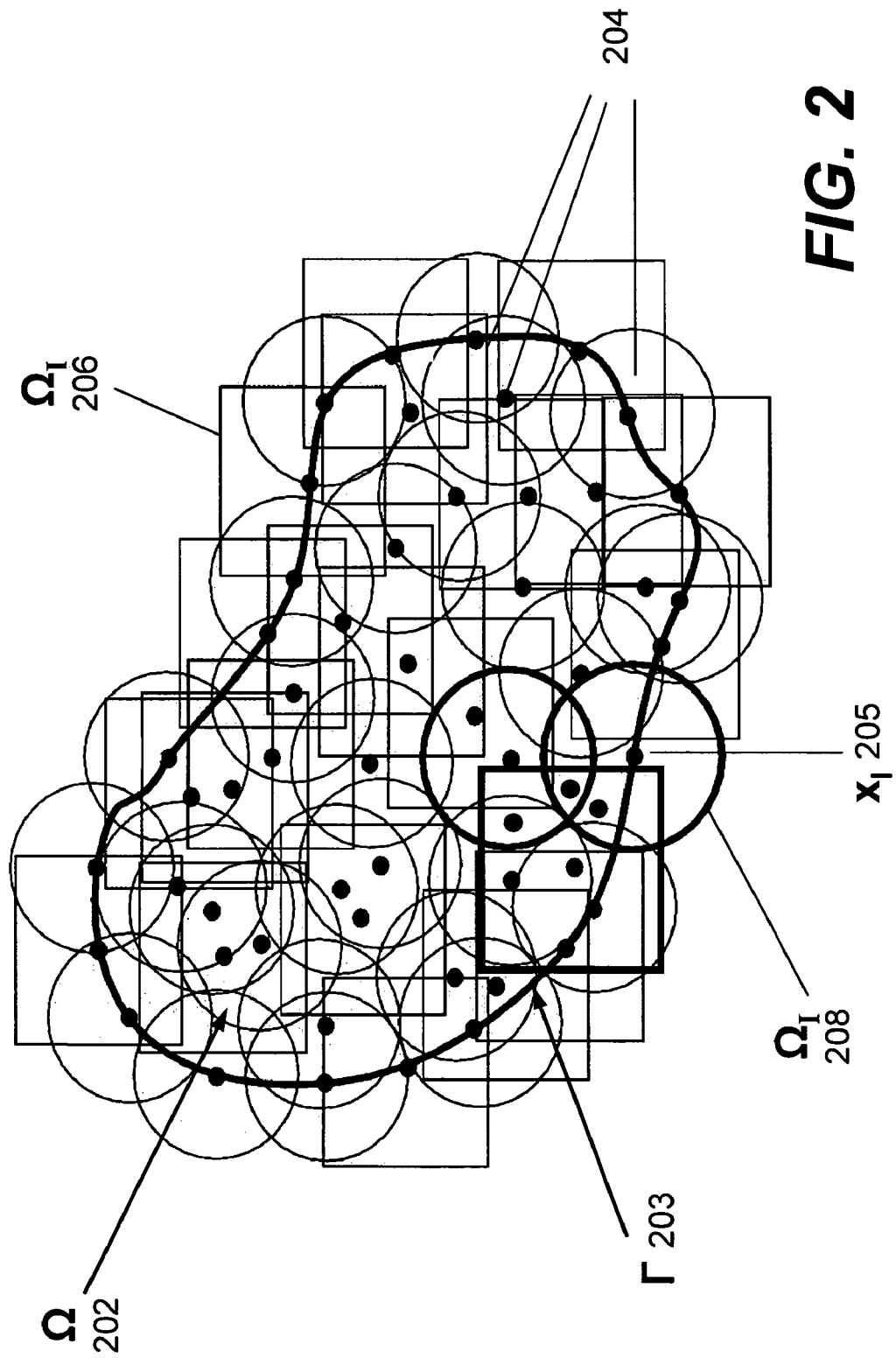
FIG. 2 shows an exemplary mesh-free analysis model in accordance with one embodiment of the present invention.

Referring now to FIG. 2, an exemplary mesh-free model 200 is shown in accordance with one embodiment of the present invention. An exemplary physical domain $\Omega$ 202 and the corresponding boundary or border $\Gamma$ 203 are depicted in FIG. 2. To represent the physical domain 202, a plurality of nodes 204 are used. The nodes representing the physical domain do not have a particular pattern. They may be regularly spaced or in random locations. These nodes may be located in the interior or on the boundary of the physical domain. Each of the nodes 204 contains a domain of influence or support $\Omega_1$ 206 or 208. The domain of influence and the support are used interchangeably hereinafter. The size and shape of the support for each node are also arbitrary. In one embodiment, the shape of the support is quadrilateral 206. In another embodiment, the shape is circular 208. In the case of three-dimensional support, the shape of the support may be spherical in that embodiment. In yet another embodiment, the size and the shape of each node are different. One node may have a one square foot support while another node may have a 16-in radius circular support in the same model. In yet another embodiment, the support is not a regular geometric shape. It can be any arbitrary shape. The present invention can support all different combinations.

In one embodiment, because of the flexibility of the present invention regarding the nodal representation 204 of the physical domain 202, a practical way to create a computer model for the mesh-free analysis is to use the FEA nodal data that is readily generated from a pre-processing software package. The pre-processing software may be a stand-alone software package or a built-in portion of an engineering design or analysis computer program product package.

Figure 3A:
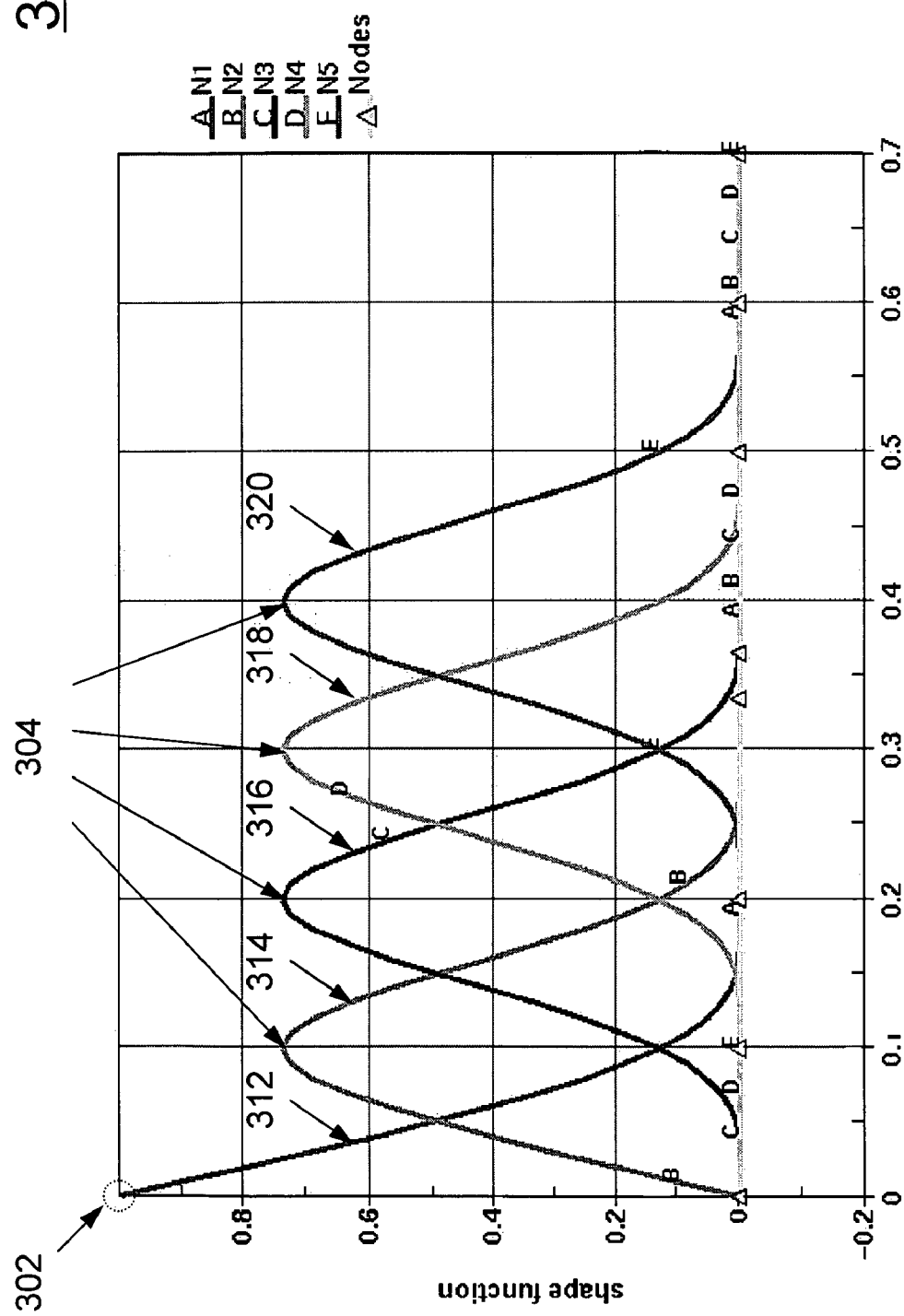
FIG. 3A shows an exemplary original chosen mesh-free shape functions in accordance with one embodiment of the present invention.
Figure 3B:
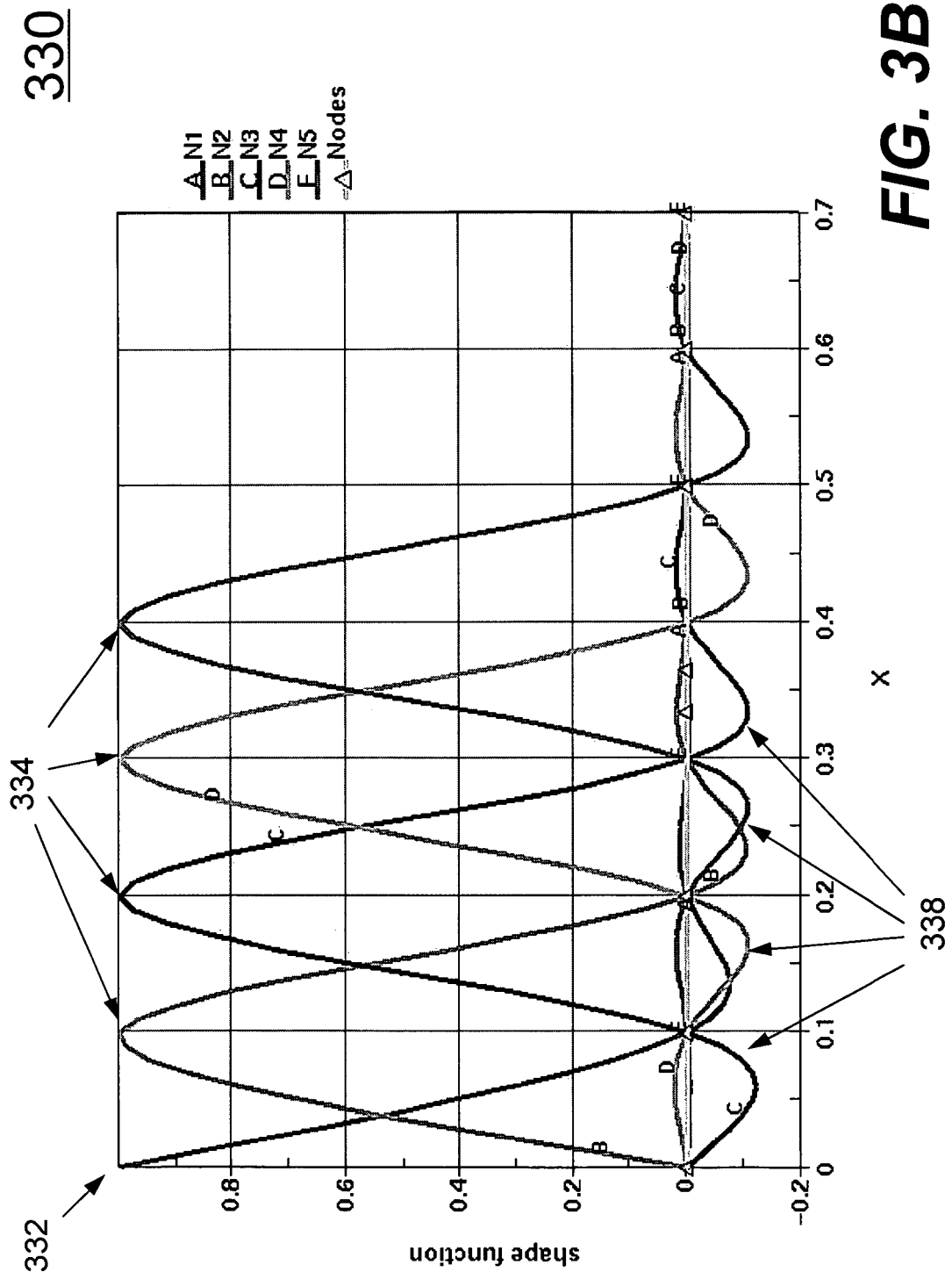
FIG. 3B show an exemplary first transformed shape functions in accordance with one embodiment of the present invention.
Figure 3C:
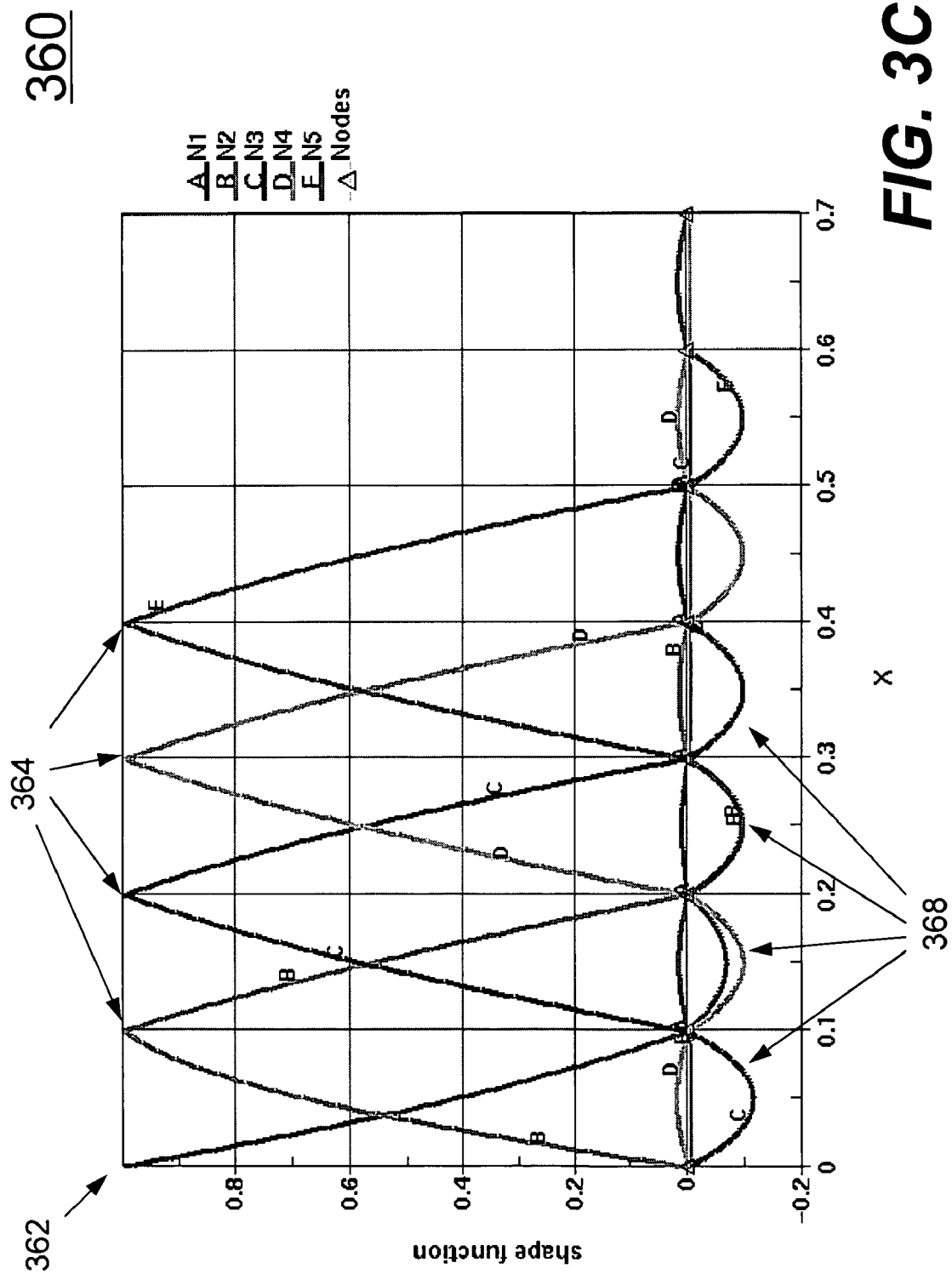
FIG. 3C shows an exemplary second transformed shape functions in accordance with one embodiment of the present invention.

FIGS. 3A-3C show an exemplary set of mesh-free shape functions in accordance with one embodiment of the present inventions. In this embodiment, the mesh-free method is carried out with the discrete Moving Least-Squared (MLS) approximation of a function u(x), denoted by $u^h(x)$, is constructed by a combination of the monomials as $$u^h(x) = \sum_{i=1}^{n} H_i(x)b_i(x) \equiv H^T(x)b(x) \qquad (1)$$

where n is the order of completeness in this approximation, the monomial $H_i(x)$ are basis functions, and $b_i(x)$ are the coefficients of the approximation. The coefficients $b_i(x)$ at any point x are depending on the sampling points $x_1$ that are collected by a weighting function $w_a(x-x_1)$. This weighting function is defined to have a compact support measured by 'a', i.e., the sub-domain over which it is nonzero is small relative to the rest of the domain. Each sub-domain $\Omega_1$ 208 is associated with a node $x_1$. The most commonly used sub-domains are blocks 206 or disks 208 in 2-D as shown in FIG. 2. In this embodiment, the cubic B-spline kernel function is chosen as the weighting function:

$$w_a(x-x_I) = \begin{cases} \frac{2}{3} - 4\left(\frac{\|x-x_I\|}{a}\right)^2 + \\ \quad 4\left(\frac{\|x-x_I\|}{a}\right)^3 & \text{for } 0 \le \frac{\|x-x_I\|}{a} \le \frac{1}{2} \\ \frac{4}{3} - 4\left(\frac{\|x-x_I\|}{a}\right) + \\ \quad 4\left(\frac{\|x-x_I\|}{a}\right)^2 - & \text{for } \frac{1}{2} < \frac{\|x-x_I\|}{a} \le 1 \\ \quad \frac{4}{3}\left(\frac{\|x-x_I\|}{a}\right)^2 \\ 0 & \text{otherwise} \end{cases} \qquad (2)$$

The moving least-squares technique consists in minimizing the weighted $L_2$-Norm as follows:

$$J = \sum_{I=1}^{NP} w_a(x-x_I)\left[\sum_{i=1}^{n} H_i(x)b_i(x) - u(x_I)\right]^2 \qquad (3)$$

where NP is the number of nodes within the support of x for which the weighting function $w_a(x-x_1) \neq 0$. Equation (3) can then be written in the form $$J = (Hb-u)^T W_a(x)(Hb-u) \quad (4)$$

where $$u^T = (u_1, u_2, \ldots u_{NP}) \quad (5)$$

$$H = \begin{bmatrix} \{H(x_I)\}^T \\ \ldots \\ \{H(x_{NP})\}^T \end{bmatrix} \quad (6)$$

$$\{H(x_i)\}^T = \{H_1(x_i), \ldots H_n(x_i)\} \quad (7)$$

$$W_a = \text{diag}[w_a(x-x_1), \ldots, w_a(x-x_{NP})] \quad (8)$$

To find the coefficients b, the extreme value of J is obtained by setting the derivative to zero:

$$\partial J/\partial b = M^{[n]}(x)b(x) - B(x)u = 0 \quad (9)$$

where $M^{[n]}(x)$ is called the moment matrix of $w_a(x-x_1)$ and is given by $$M^{[n]}(x) = H^T W_a(x) H \quad (10)$$

$$B(x) = H^T W_a(x) \quad (11)$$

Thus $$b(x) = M^{[n]-1}(x) B(x) u \quad (12)$$

For $M^{[n]}(x)$ to be invertible, the support of $w_a(x-x)$ needs to be greater than a minimum size that is related to the order of basis functions. Using the solution of Equations (1), (10), (11) and (12), the approximation is obtained by $$u^h(x) = \sum_{I=1}^{NP} \Psi_I(x) u_I \quad (13)$$

where the shape functions $\Psi_I(x)$ are given by $$\Psi_I(x) = H^T(x) M^{[n]-1}(x) B(x) \quad (14)$$

and $\Psi_I(x)$ are nth-order complete as indicated below:

$$\sum_{I=1}^{NP} \Psi_I(x) x_{1I}^p x_{2I}^q = x_1^p x_2^q \text{ for } p+q = 0, \ldots n \quad (15)$$

An exemplary original chosen mesh-free shape functions 300 are smoothed but monomial functions as shown in FIG. 3A. The original chosen mesh-free shape functions 300 are based on a set of one-dimensional regularly distributed nodes, N1 312, N2 314, N3 316, N4 318 and N5 320. When the distribution of the nodes become irregular, the non-linearity of the shape functions will increase. As a consequence, the derivatives of the shape functions might have oscillations and peaks, and a very high number of integration points are required so that the integration can yield with sufficient accuracy.

In a slightly different form, the displacement u is approximated by the mesh-free shape functions in the following form:

$$u_i(x) = \sum_{I=1}^{NP} \Psi_I(x) d_{iI} \quad (16)$$

where $d_{iI}$ is called the 'generalized displacement', which is not the real nodal displacement. This is indicated by the value 302 is not equal to 1.0 at x=0 in FIG. 3A. This is because, in general, mesh-free shape functions $\Psi_I$ do not possess Kronecker delta properties indicated by the values 304 not equal to 1.0, $$\Psi_I(x_J) \neq \delta_{IJ} \quad (17)$$

As a result, a special treatment is required to enforce essential boundary conditions in the initial/boundary value problem. There are many techniques for traditional mesh-free methods to impose the essential boundary condition. In this embodiment, a transformation method uses kinematically admissible mesh-free shape functions to impose the essential boundary conditions. $\hat{d}_{i,J}$ is defined as the ith displacement component of node J using Equation (16) as follows:

$$\hat{d}_{iJ} = \sum_{I=1}^{NP} \Psi_I(x_J) d_{iI} \quad (18)$$

or $$\hat{d} = Ad, A_{IJ} = \Psi_J(x_I) \quad (19)$$

where A is called the transformation matrix. Therefore the admissible test function for the variation equations is $$\delta d = A^{-1} \delta \hat{d} \quad (20)$$

and the final matrix equations for the elasto-dynamic problem can be written as $$\delta \hat{u}^T A^{-T} M A^{-1} \ddot{\hat{d}} = \delta \hat{u}^T A^{-T} R \quad (21)$$

where $$d_I = [d_{1I}, d_{2I}, d_{3I}]^T$$

$$M_{IJ} = \int_{\Omega_x} \rho \Psi_I(x) \Psi_J(x) d\Omega = \int_{\Omega_x} \rho^0 \Psi_I(x) \Psi_J(x) d\Omega \quad (22)$$

$$R_I = \int_{\Omega_x} B_I^T(x) \cdot \sigma(F) d\Omega - \int \Psi_I(x) h J_{\Gamma_h} - \int_{\Omega_x} \Psi_I(x) f_b d\Omega$$

and F is the deformation gradient, h is the surface traction, $f_b$ is the body force, $\rho$ is the current density, $\rho^0$ is the initial density, and $B_I^T(x)$ is the gradient matrix obtained from Equation (18). In the explicit dynamic analysis, a row-sum method is used to construct the lumped mass. The discrete equations with the lumped mass $M^{lump}$ to be solved can be rewritten in the following form:

$$M^{lump} \ddot{\hat{d}} = A^{-T} R \quad (23)$$

Usually the lumped mass only needs to be computed at once if the Lagrangian shape functions are adopted. The transformation matrix and its inversion also need to be computed at the pre-processing stage in nonlinear computation.

The efficiency of the mesh-free method therefore is determined by the evaluation on right-hand side of Equation (23). The evaluation of right hand side of equation (23) includes the domain of integration for the internal forces R and the matrix multiplication of $A^{-T} \cdot R$. Usually a high order integration rule is required for the evaluation of the internal force R due the high order nonlinear characteristics in the mesh-free shape functions. Also an efficient implicit solver is required for the matrix multiplication of $A^{-T} \cdot R$. This is the main reason for the high computation cost in the conventional mesh-free method.

In one embodiment, the first-level transformation scheme used is employed to preserve the Kronecker delta properties of the mesh-free approximation. The first-level transformation scheme transforms the non-interpolated original chosen mesh-free shape functions into the interpolation functions with the same consistency requirements. The first-level transformation eliminates the need of the matrix multiplication of $A^{-T} \cdot R$. As a result, the imposition of essential boundary conditions is simplified. Equation (18) can be rewritten as:

$$\hat{d}_{iJ} = \sum_{I=1}^{NP} \Psi_I(x_J) d_{iI} = \sum_{I=1}^{NP} T'_{IJ} d_{iI} \qquad (24)$$

where $$T_{IJ}' = \Psi_I(x_J) \qquad (25)$$

and $$d_{iI} = \sum_{J=1}^{NP} T'_{IJ}{}^{-1} \hat{d}_{iJ} \qquad (26)$$

By substituting Equation (26) into Equation (16), $$u_i(x) = \sum_{I=1}^{NP} \Psi_I(x) d_{iI} = \sum_{J=1}^{NP} \hat{\Psi}_J(x) \hat{d}_{iJ} \qquad (27)$$

Where $$\hat{\Psi}_J(x) = \sum_{I=1}^{NP} T'^{-1}{}_{JI} \Psi_I(x) \qquad (28)$$

$\hat{\Psi}_J(x)$ is the first transformed mesh-free shape function of node J. An exemplary first transformed mesh-free shape function 330 is shown in FIG. 3B. In this embodiment, the value 332 is equal to 1.0 at x=0, which means that the essential boundary conditions can be imposed directly. The values 334 are equal to 1.0 indicate that the Kronecker delta properties are preserved in this exemplary first transformed mesh-free shape function 330. This is because the introduction of the admissible test functions for the variation equations has implicitly transformed the generalized nodal displacement $d_I$ to the real (or physical) nodal displacement $\hat{d}_I$ through the transformation matrix A in Equation (20-21). Therefore, the direct evaluation of the first transformed mesh-free shape functions is not necessary. Another reason is the first transformed mesh-free shape function 330 is also a high order monomial function that experiences even higher order non-linearity than the original chosen non-interpolated mesh-free shape function 300. The high order non-linearity is indicated by the shapes 338 of the first transformed mesh-free shape function 330. A very high order integration rule will be expected for the direct use of the first transformed mesh-free shape functions in the mesh-free computation.

As a result, a dramatic increase in the computing cost cannot be avoided. In order to take the advantage of the first transformed mesh-free shape function in the imposition of essential boundary condition, a second-level transformation scheme is proposed to resolve the above problem in the numerical integration. This second-level transformation scheme can be regarded as a low pass filter that filters out the high frequencies in the audio signals. In computation mechanics, the second-level transformation scheme serves as a regularization process that filters out the higher-order terms in the monomial mesh-free approximation obtained from the first-level transformation scheme with desired consistency and completeness conditions.

Consider the fast mesh-free method solution approximation after the first-level transformation is $$u_\Omega^h(x) = \sum_{\substack{J \in \Omega \\ x \in \Omega}} \hat{\Psi}_J^{[m]}(x) \hat{d}_J \qquad (29)$$

where $\hat{\Psi}_J^{[m]}$ is an m-th order first transformed mesh-free shape function (e.g., 330 in FIG. 3B), and m is the order of the monomial basis function in mesh-free interpolation. Its completeness condition can be expressed as follows:

$$\sum_{J=1}^{NP} \hat{\Psi}_J(x) x_{1J}^p x_{2J}^q = x_1^p x_2^q \text{ for } p+q = 0, \ldots m \qquad (30)$$

From Equation (27), $$\hat{d}_I = \sum_{J \in \Omega} \hat{\Psi}_J^{[m]}(x_I) \hat{d}_J \qquad (31)$$

A local solution approximation is given by $$u_\Omega^h(x) = \sum_{\substack{I \in \Omega \\ x \in \Omega}} \Phi_I^{[n]}(x) \hat{d}_I \qquad (32)$$

where $\Phi_I^{[n]}$ is an n-th order smoothing interpolation. In general, the order n is greater equal than the order m (n≧m). In this embodiment, the order m is chosen as 1, the order n is either 1 or 2. The order n is set to 1 for compressible material such as foam, while the order n is set to 2 for nearly incompressible material such as steel, rubber, etc. The local completeness condition is given by $$\sum_{I=1}^{NP} \Phi_I(x) x_{1I}^p x_{2I}^q = x_1^p x_2^q \text{ for } p+q = 0, \dots n \quad (33)$$

Substitute Equation (33) into Equation (32) with the help of Equation (31), $$u_{\Omega}^h(x) = \sum_{\substack{I \in \bar{\Omega} \\ x \in \Omega}} \Phi_I^{[n]}(x) \cdot \sum_{J \in \bar{\Omega}} \hat{\Psi}_J^{[m]}(x_J) x_J \equiv \sum_{\substack{I \in \bar{\Omega} \\ x \in \Omega}} \Psi_I^{[m]}(x) x_I \quad (34)$$

where $$\Psi_I^{[m]}(x) = \sum_{J \in \bar{\Omega}} \hat{\Psi}_I^{[m]}(x_J) \Phi_J^{[n]}(x) \quad (35)$$

FIG. 3C shows an exemplary second transformed mesh-free shape function 360 in accordance with one embodiment of the present invention. It evident that the essential boundary conditions can be applied directly as indicated by the value 362 of 1.0 at x=0. The Kronecker delta properties are preserved as indicated by values 364 of 1.0. The high-order non-linearity nature of the monomial functions are filtered out as shown in shapes 368. As a result, the lower number of integration points are needed to integration the mesh-free approximation.

FIG. 4 shows a flow chart or process 400 of a practical fast mesh-free analysis of a structure in accordance with one embodiment of the present invention. The process 400, which is preferably understood in conjunction with the previous figures especially FIGS. 2-3C, may be implemented in software, hardware, or a combination of both. In this embodiment, the process 400 starts by defining a plurality of nodes to represent the structure to be analyzed at 402. Each of the nodes has a domain of influence or support to associate with. The shape of support can be circular, rectangular or any other shape as shown in FIG. 2. At 404, an approximation method is chosen and a set of original chosen mesh-free shape functions are constructed. One exemplary approximation is Moving Least-Squared (MLS) approximation. The process 400 moves to a test 406, in which the original chosen mesh-free shape functions are examined whether the Kronecker delta properties are possessed. If the test 406 is not true, the process 400 follows the no branch to 410, in which the process 400 converts the original chosen non-interpolated mesh-free shape functions to first transformed mesh-free shape functions. The first transformed mesh-free shape functions possess the Kronecker delta properties so that the essential boundary conditions can be imposed directly. Otherwise if the test 406 is true, the conversion of the original chosen mesh-free shape functions is not required. The process 400 simply designates the original chosen mesh-free shape functions as the first transformed mesh-free shape functions at 408. The two branches of the process 400 are then merged at 412, in which a low pass filter function is selected. This low pass filter function is similar to the ones used in the signal processing field. The low pass filter function is used to filter out the high frequency components of a signal in the signal processing field. In the present invention, this low pass filter is used as a regularization process that filters out the high-order terms in the monomial mesh-free approximation as a result of the first level transformation. Next, the process 400 moves to 414 to create second transformed mesh-free shape functions using the first transformed mesh-free shape functions and the low pass filter functions selected in 412. Finally the process 400 carries out the mesh-free approximation at 416 with a reasonable number of integration points, therefore the computational cost is reduced.

Although an exemplary embodiment of invention has been disclosed, it will be apparent to those skilled in the art that various changes and modifications may be made to achieve the advantage of the invention. It will be obvious to those skilled in the art that some components may be substituted with another component providing same function. The appended claims cover the present invention.

What is claimed is:

1. A method of performing a mesh-free analysis of a general three-dimensional structure, the method comprising:
    defining a plurality of nodes representing the general structure in a computer system having a mesh-free analysis application module installed thereon;
    choosing a mesh-free approximation scheme to be used in the mesh-free analysis application module;
    constructing a set of original mesh-free shape functions based on the chosen mesh-free approximation scheme;
    when the original shape function is lack of Kronecker delta properties, converting the original shape function to a first transformed mesh-free shape function;
    otherwise designating the original shape function as the first transformed mesh-free shape function, such that the first transformed mesh-free shape function always possesses the Kronecker delta properties;
    selecting a low pass filter function;
    creating a second transformed mesh-free shape function by applying only the low pass filter function to the first transformed mesh-free shape function; and
    performing a mesh-free analysis of the general structure in the computer system using a low-order integration rule in the mesh-free analysis application module, wherein the mesh-free analysis's results are stored to a storage device coupled to the computer system for assisting a user to make decision in improvements of the general structure.

2. The method of claim 1, wherein the plurality of nodes is arbitrarily spaced.

3. The method of claim 1, said defining a plurality of nodes further includes assigning a domain of influence to each of the nodes.

4. The method of claim 3, wherein the domain of influence has a circular shape in two-dimensional and a spherical shape in three-dimensional space.

5. The method of claim 1, wherein the mesh-free approximation scheme is Moving Least-Squared method.

6. The method of claim 5, wherein the set of original mesh-free shape functions corresponding to Moving Least-Squared method is lack of the Kronecker delta properties and is non-interpolated.

7. The method of claim 1, wherein the first transformed mesh-free shape function is configured to allow a set of essential boundary conditions to be imposed directly to corresponding one or ones of the nodes.

8. The method of claim 1, wherein the first transformed mesh-free shape function comprises a high order monomial function.

9. The method of claim 8, wherein the low pass filter function uses a regularization scheme that filters out high-order terms of the monomial function.

10. The method of claim 8, wherein the second transformed mesh-free shape function includes only low order terms of the monomial function.

11. A non-transitory computer usable storage medium containing instructions for controlling a computer system having at least one processor for performing a mesh-free analysis of a general three-dimensional structure, by a method comprising:

defining a plurality of nodes representing the general structure in the computer system;

choosing a mesh-free approximation scheme;

constructing a set of original mesh-free shape functions based on the chosen mesh-free approximation scheme;

when the original shape function is lack of Kronecker delta properties, converting the original shape function to a first transformed mesh-free shape function;

otherwise designating the original shape function as the first transformed mesh-free shape function, such that the first transformed mesh-free shape function always possesses the Kronecker delta properties;

selecting a low pass filter function;

creating a second transformed mesh-free shape function by applying only the low pass filter function to the first transformed mesh-free shape function; and performing a mesh-free analysis of the general structure in the computer system using a low-order integration rule, wherein the mesh-free analysis's results are stored to a storage device coupled to the computer system for assisting a user to make decision in improvements of the (general structure.

12. The non-transitory computer usable storage medium of claim 11, wherein the first transformed mesh-free shape function is configured to allow a set of essential boundary conditions to be imposed directly.

13. The non-transitory computer usable storage medium of claim 11, wherein the first transformed mesh-free shape function comprises a high order monomial function.

14. The non-transitory computer usable storage medium of claim 13, wherein the second transformed mesh-free shape function includes only low order terms of the monomial function.

15. A system for performing a mesh-free analysis of a general three-dimensional structure, the system comprising:

an I/O interface;

a communication interface;

a secondary memory;

a main memory for storing computer readable code for a mesh-free application module;

at least one processor coupled to the main memory, the secondary memory, the I/O interface, and the communication interface, said at least one processor executing the computer readable code in the main memory to cause the application module to perform operations of:

defining a plurality of nodes representing the general structure in the system;

choosing a mesh-free approximation scheme to be used in the mesh-free analysis application module;

constructing a set of original mesh-free shape functions based on the chosen mesh-free approximation scheme;

when the original shape function is lack of Kronecker delta properties, converting the original shape function to a first transformed mesh-free shape function;

otherwise designating the original shape function as the first transformed mesh-free shape function, such that the first transformed mesh-free shape function always possesses the Kronecker delta properties;

selecting a low pass filter function;

creating a second transformed mesh-free shape function by applying only the low pass filter function to the first transformed mesh-free shape function; and performing a mesh-free analysis of the general structure in the system using a low-order integration rule in the mesh-free analysis application module, wherein the mesh-free analysis's results are stored to a storage device coupled to the system for assisting a user to make decision in improvements of the general structure.

16. The system of claim 15, wherein the first transformed mesh-free shape function is configured to allow a set of essential boundary conditions to be imposed directly.

17. The system of claim 15, wherein the first transformed mesh-free shape function comprises a high order monomial function.

18. The system of claim 17, wherein the second transformed mesh-free shape function includes only low order terms of the monomial function.

\* \* \* \* \*